United States Patent [19]
Hervig

[11] 4,241,004
[45] Dec. 23, 1980

[54] HIGH VOLTAGE SPLICE

[76] Inventor: Harold C. Hervig, P.O. Box 33427, St. Paul, Minn. 55133

[21] Appl. No.: 32,384

[22] Filed: Apr. 23, 1979

Related U.S. Application Data

[62] Division of Ser. No. 940,356, Sep. 7, 1978, Pat. No. 4,164,620.

[51] Int. Cl.³ ............................................. B32B 31/06
[52] U.S. Cl. ..................................... 264/262; 264/261; 264/266
[58] Field of Search ................ 264/261, 262, 263, 266

[56] References Cited

U.S. PATENT DOCUMENTS

| | | | |
|---|---|---|---|
| 3,097,060 | 7/1963 | Sullivan | 264/261 |
| 4,034,151 | 7/1977 | Silva | 174/73 R |
| 4,079,189 | 3/1978 | Troccoli | 174/73 R |

*Primary Examiner*—James H. Derrington

[57] ABSTRACT

Insulative sheath for high voltage cable splices has inner semiconductive member with inwardly directed bosses for positioning the sheath radially of the cable and splice and for contacting the connector of the splice to suppress corona discharge.

2 Claims, 13 Drawing Figures

HIGH VOLTAGE SPLICE

CROSS REFERENCE TO RELATED APPLICATION

This application is a division of copending application Ser. No. 940,356, filed Sept. 7, 1978 now U.S. Pat. No. 4,164,620.

FIELD OF THE INVENTION

This invention relates to a high voltage cable splice and to an improved anticorona discharge shielding insulator for high voltage cable splices and too methods or fabricating such insulators.

BACKGROUND OF THE INVENTION

In the transmission of currents at high voltage and particularly in distribution systems which are underground, numerous splices or connections are necessary. These are conveniently effected using metallic sleeves crimped to bare ends of the cables followed by applying suitable insulation and shielding. Other methods have been used as described in some detail in U.S. Pat No. 4,079,189. As recognized in that patent, a major problem in such splices is the occurrence of corona discharge in air pockets around the splice. Such discharge tends to deteriorate cable insulation and create interference at many wavelengths of radio emission, i.e. static. Suppression of the discharge is therefore most important.

In U.S. Pat. No. 4,079,189 an insulator is provided with inner and outer semiconductive sections and end caps and an intermediate insulative section. The inner semiconductive section has a plurality of circumferentially spaced ribs extending inwardly. The ribs extend over a major portion of a crimped metallic connector of cable ends and contact the connector under compression as a result of deformation and bending. It would appear that insulators as described might be difficult to fabricate using a molded inner semiconductive ribbed section. It would further appear that the force with which the ribs contact the connector might be relatively weak. It is an object of the present invention to provide an insulator for splices of high voltage cables which is readily manufactured and provides good insulation and suppression of corona discharge.

In accordance with the above and other objects of the invention it has been found that a convenient and efficient process for the production of insulating corona discharge suppressing shields for splices of high voltage lines comprises the steps of applying a tube of semiconductive elastomeric material having a wall of substantially uniform thickness to a mandrel having a pattern of depressions in a raised portion thereof, placing on said mandrel, positioned apart from said tube, end caps of generally elongated tubular form having outer and inner ends and having outer termination segments distal to said tube of uniform internal and external diameter and inner enlarged segments having variable external diameter and internal diameter varying from being equal to the internal diameter of said terminal segment to being greater than the external diameter of said terminal segment, placing a form or mold having a sprue opening at least around and between the enlarged segments of said end caps and injecting elastomer composition curable to insulative material through said sprue hole around said semiconductive tube and in said end caps while forcing said tube into the depressions in said mandrel. In a preferred embodiment of the invention the outer end of the termination segment of each end cap is formed with at least double undercutting toward the internal diameter as further described below. After addition of an outer annular semiconductive cover extending onto and between the enlarged segments of said end caps, there is obtained an insulative corona discharge suppressing shield for positioning over and along a splice in high voltage cable of generally circular cross section having semiconductive covering and insulating covering and an inner conductor and having an electrical connector electrically joining two bare ends of said conductor, said shield comprising two end caps having openings therein adapted to engage said semiconductive covering electrically, annular inner and outer semiconductive sections and an insulative section having inwardly directed bosses over at least a portion thereof extending inward and being integrally bonded at least to said inner semiconductive section and said end caps, said inner semiconductive section having a wall of substantially uniform thickness and further being urged inwardly by said bosses into electrical contact with said electrical connector when said shield is positioned on a high voltage cable splice.

It is found advantageous to have an inner semiconductive section of substantially uniform wall thickness to facilitate sliding of and positioning the sleeve over cables because the lesser stiffness over molded protuberances of semiconductive material permits easier deformation during installation. The urging inwardly of the inner semiconductive section by bosses provides superior electrical contact and enhances the reliability of the installed sleeve.

THE DRAWING

Figure 1:
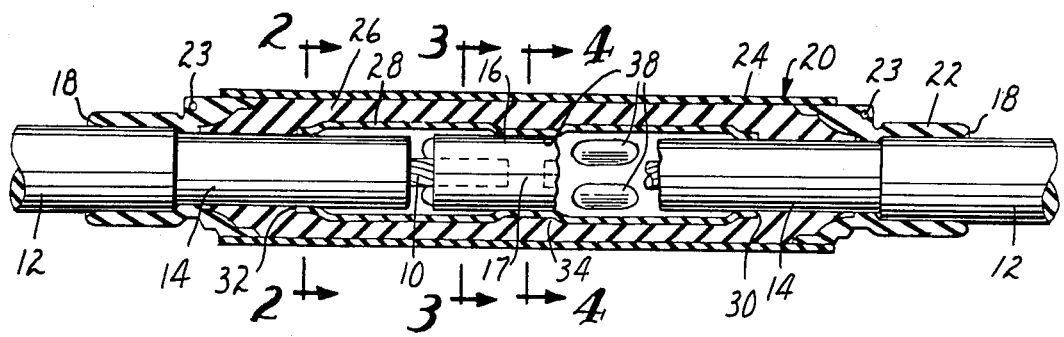
FIG. 1 is a longitudinal sectional view through an insulative sheath of the invention in place over a cable splice.
Figure 2:
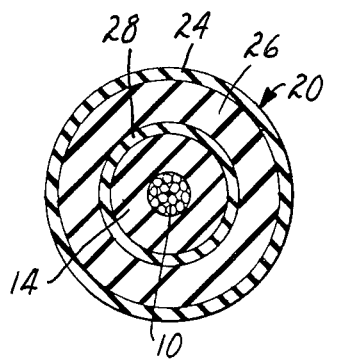
FIGS. 2, 3 and 4 are cross sectional views of an insulative sheath of FIG. 1 at 2—2, 3—3 and 4—4 respectively.
Figure 3:
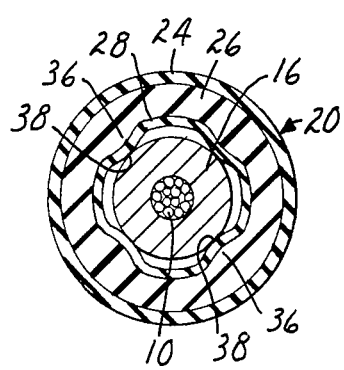
Figure 4:
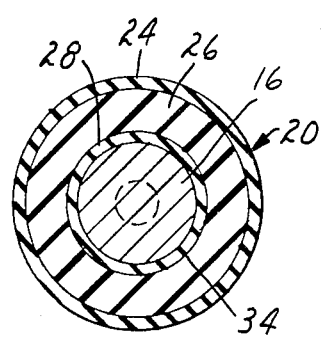

Referring to FIGS. 1 through 4 it will be seen that wire cable 10 with cable insulative layer 14 and cable outer semiconductive cover 12 is joined at bare ends by connector 16 having a central stop 17. Insulative sleeve 20 of the invention comprising outer semiconductive cover 24 and integrally bonded end caps 22, insulative section 26 and inner semiconductive section 28 is in position over the joint formed by connector 16 and overlapping the insulative layer 14 of the cable. End caps 22 are provided with grounding eyes 23 and are in contact with cable outer semiconductive cover 12 and provide terminations 18 of the sheathes. Inner semiconductive section 28 is constricted at ends 30 and 32 and is urged inward as seen at 38 in FIGS. 1 and 3 by constrictive boss 34 centered over connector 16 and longitudinal bosses 36. Said bosses urge semiconductive section 28 into contact with connector 16 and thereby achieve lower electrical resistance therebetween.

It will be apparent that various configurations of bosses may be used within the scope of the invention. The term is used herein to include protuberances which are round or may be elongated lengthwise of the sleeve or may extend circumferentially of the sleeve and form a constrictive ring. There must be at least one or more bosses centering on and urging electrical contact of the inner semiconductive section with the connector. Preferably contact should cover 10% or more of the surface of the connector.

Figure 5:
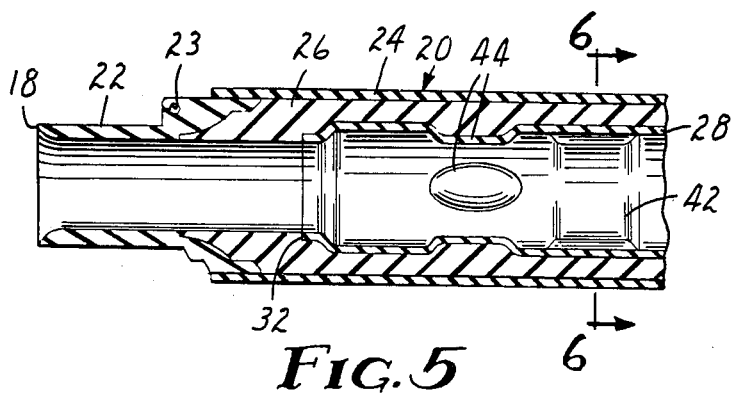
FIG. 5 shows a partial longitudinal section of another embodiment of the invention with no cable present.
Figure 6:
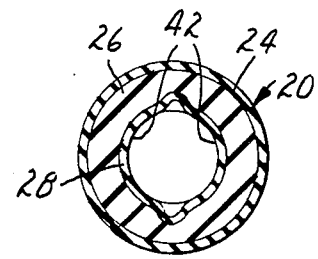
FIG. 6 shows a cross sectional view at 6—6 of the embodiment of FIG. 5.

A different embodiment is illustrated in FIGS. 5 and 6 where the central boss 42 is in two parts as shown in FIG. 6 and shorter bosses 44 are provided on either side thereof. One side of the embodiment only is shown, i.e., on the left side of center line 6—6.

Figure 7:
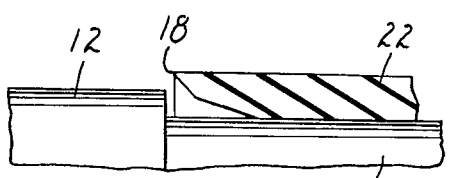
FIGS. 7, 8 and 9 show enlarged details of an outer end of an insulative sheath of the invention.
Figure 8:
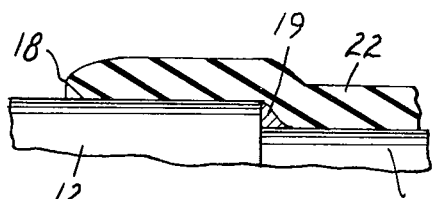
Figure 9:
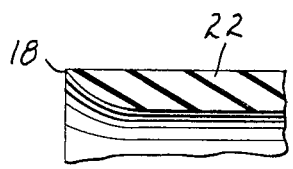
Figure 10:
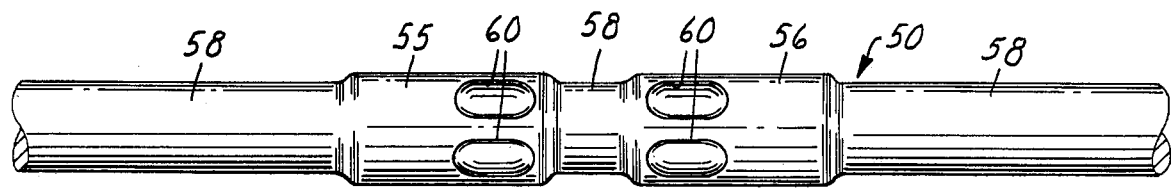
FIG. 10 shows a mandrel for forming the insulative sheath of the invention as shown in FIG. 1.

In FIGS. 7 and 9 are seen preferred terminations 18 for insulative sheathes of the invention. It is found to be advantageous for the termination to be at least doubly undercut or chamferred as shown in FIG. 7 so that lubricant is spread over the cable's insulation covering rather than being scraped away. The lubricant, suitably a silicone grease, is then accumulated as seen at 19 and thereby avoids the formation of an air pocket. The extreme of such multiple undercutting is a curved termination 18 as seen in FIG. 9 and this is here construed be included in the term at least doubly undercut. In FIG. 8 it is seen how termination 18 is drawn over cable outer semiconductive cover 12. It will be noted that the inner diameter of the sheath at termination 18 is approximately that of the outer diameter of the insulating covering of the cable and that termination 18 is thicker than cable outer semiconductive cover 12. Both proportions are found to be advantageous in avoiding inclusion of air and the doubly undercut to curved outer end of the termination segment of the end caps further assists in installation.

Figure 11:
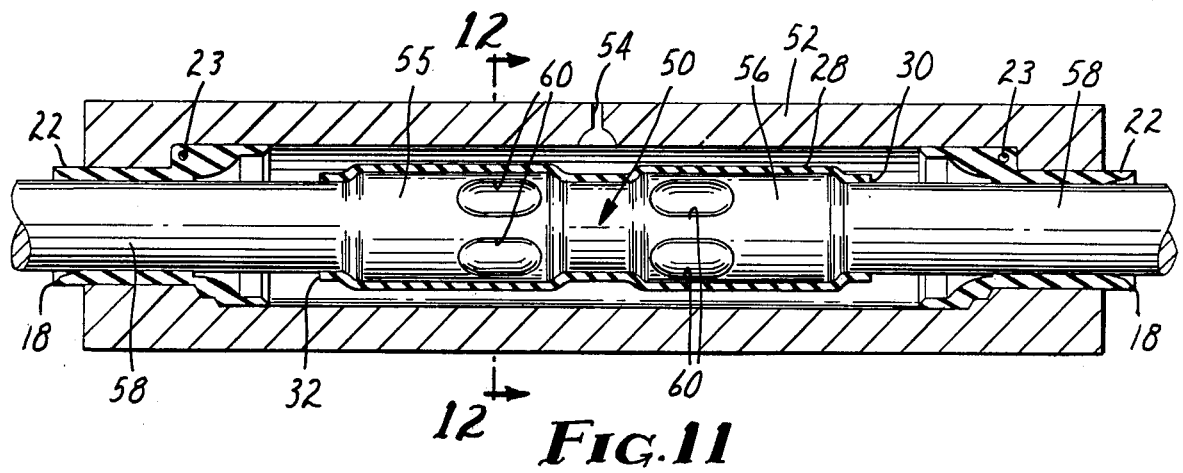
FIG. 11 shows, in a cut away view, how an insulative sheath of the invention is formed on the mandrel of FIG. 11.
Figure 12:
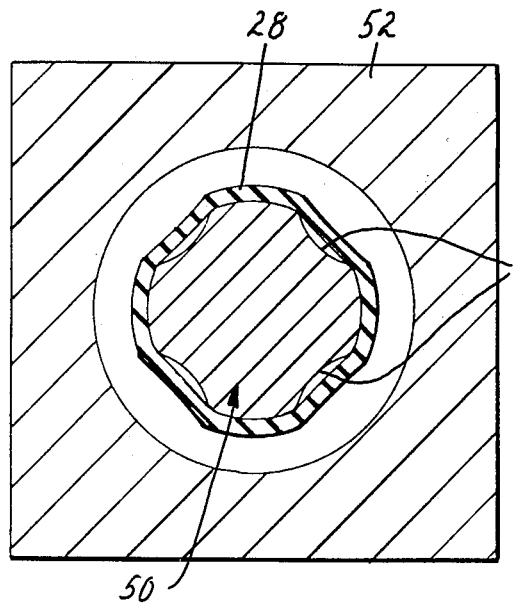
FIG. 12 shows a sectional view at 12—12 of FIG. 11 before injection of the insulative material.
Figure 13:
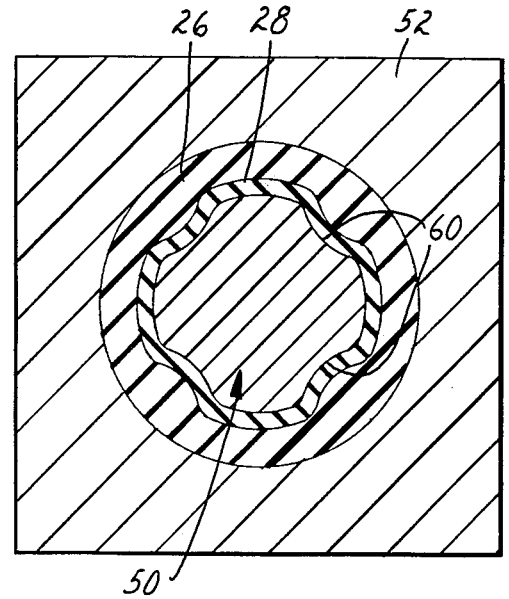
FIG. 13 shows a sectional view at 12—12 of FIG. 11 after insulative material has been injected.

In FIGS. 10-13 is seen a mandrel 50 for molding an insulative sheath of the invention as shown in FIGS. 1-4 inclusive. In FIG. 11 mandrel 50 is seen in form 52 with sprue hole 54 for injection of the insulative material of the sheath between end caps 22 and around inner semiconductive section 28. In this Figure it will be seen that the latter 28 is a piece of tubing which has slightly smaller diameter than the shaft 58 of the mandrel and hence conforms thereto and has substantially uniform thickness which is not materially altered by deformations thereof, for example over enlarged portions 55 and 56 of the mandrel. It will be seen that depressions 60 are provided in mandrel 50 over which inner conductive section 28 stretches when in tube form as seen in FIG. 12 and into which it is forced with injection of insulative material forming insulative section 26 and hobs 36. The thickness of inner semiconductive section 28 is selected to carry the electrical load to which it is subjected and in view of its conductivity. A thickness of about 1 to 2 mm or slightly more is usually sufficient.

I claim:

1. The process for production of an insulative corona discharge suppressing shield for a splice of a high voltage line comprising the steps of
   I. providing a mandrel having a shaft portion and at least one expanded portion with depressions in said expanded portion extending radially inward,
   II. applying a tube of semiconductive elastomeric material of substantially uniform thickness and an unstretched diameter less than that of said shaft portion of said mandrel over the expanded portion and a portion of the shaft portion at the ends of the expanded portion of said mandrel,
   III. positioning a pair of end caps on said mandrel, one spaced from each end of said tube, said end caps being of generally elongated tubular form having outer and inner ends and having outer termination segments of uniform internal and external diameter distal to said tube and inner enlarged segments having variable external diameter and internal diameter varying from being equal to the internal diameter of said terminal segment to being greater than the external diameter of said terminal segment,
   IV. placing a form or mold having a sprue opening around said ends caps,
   V. injecting elastomer composition curable to insulative material through said sprue hole around said semiconductive tube and in said end caps while forcing said tube into the said depressions of said mandrel, and
   VI. curing said elastomer composition.

2. The process of claim 1 wherein said step of providing a mandrel comprises providing a said mandrel having two of said expanded portions separated by a shaft portion and said step of applying a said tube of semiconductive elastomeric material comprises applying said tube over said expanded portions, said shaft portion separating said expanded portions and a portion of said shaft portion at the distal ends of said expanded portions.

* * * * *